(12) United States Patent
Chen et al.

(10) Patent No.: US 10,684,702 B2
(45) Date of Patent: Jun. 16, 2020

(54) CURSOR CALIBRATION METHOD BY DETECTING AN ELEVATION ANGLE AND CURSOR CALIBRATION SYSTEM

(71) Applicant: QISDA CORPORATION, Taoyuan (TW)

(72) Inventors: Wei-Jou Chen, Hsinchu County (TW); Wen-Hung Li, Tainan (TW)

(73) Assignee: Qisda Corporation, Taoyuan (TW)

( * ) Notice: Subject to any disclaimer, the term of this patent is extended or adjusted under 35 U.S.C. 154(b) by 102 days.

(21) Appl. No.: 16/005,695

(22) Filed: Jun. 12, 2018

(65) Prior Publication Data

US 2018/0356906 A1    Dec. 13, 2018

(30) Foreign Application Priority Data

Jun. 13, 2017  (CN) .......................... 2017 1 0442889

(51) Int. Cl.
 G06F 3/033    (2013.01)
 G06F 3/0346   (2013.01)
 G06F 3/01     (2006.01)
 G06F 3/038    (2013.01)
 G06F 3/0481   (2013.01)

(52) U.S. Cl.
 CPC ............ *G06F 3/0346* (2013.01); *G06F 3/017* (2013.01); *G06F 3/038* (2013.01); *G06F 3/0383* (2013.01); *G06F 3/04812* (2013.01)

(58) Field of Classification Search
 CPC ........ G06F 3/017; G06F 3/038; G06F 3/0383; G06F 3/0346; G06F 3/0481; G06F 3/04812
 See application file for complete search history.

(56) References Cited

U.S. PATENT DOCUMENTS

| | | | |
|---|---|---|---|
| 7,256,772 B2 * | 8/2007 | Morrison | G06F 3/0428 178/18.01 |
| 7,942,745 B2 * | 5/2011 | Ikeda | A63F 13/06 463/38 |
| 8,010,313 B2 * | 8/2011 | Mathews | G06F 3/038 345/158 |
| 9,804,689 B2 * | 10/2017 | Cheng | G06F 3/0304 |
| 10,379,627 B2 * | 8/2019 | Cheng | G06F 3/0383 |
| 2015/0054745 A1 * | 2/2015 | Cheng | G06F 3/0304 345/158 |

FOREIGN PATENT DOCUMENTS

| | | |
|---|---|---|
| CN | 103443756 A | 12/2013 |
| CN | 105190475 A | 12/2015 |

* cited by examiner

*Primary Examiner* — Vijay Shankar

(57) ABSTRACT

A cursor calibration method includes setting a threshold angle, and when an angle of elevation between a pointing direction of a pointer and a horizontal plane is reduced from greater than the threshold angle to smaller than or equal to the threshold angle, displaying the cursor of the pointer on a predetermined position of a display.

10 Claims, 7 Drawing Sheets

CURSOR CALIBRATION METHOD BY DETECTING AN ELEVATION ANGLE AND CURSOR CALIBRATION SYSTEM

BACKGROUND OF THE INVENTION

1. Field of the Invention

The present invention illustrates a cursor calibration method, and more particularly, the cursor calibration method by using variation of an elevation angle in order to trigger a cursor calibration function.

2. Description of the Prior Art

With advancements of techniques, various display devices and projecting devices in conjunction with pointers are used for presentation. For example, in a conference meeting presentation, a user can use a laser pointer for projecting a cursor to a display. The laser pointer can use a light emitting diode disposed on a transmitted terminal for converting internal energy (i.e., such as a battery) to a laser light signal with wavelength equal to hundreds of nanometers. After the laser light signal is emitted from the transmitted terminal of the laser pointer, the cursor can be generated on the display. For example, a red laser light signal with wavelength equal to 650 to 750 nanometers can be emitted from the laser pointer. After the red laser light signal is projected to the display (i.e., such as a projection wall), a red light point is generated on the display. Such the red light point can be regarded as the cursor. When the laser pointer is moved by the user, the cursor is moved accordingly. Therefore, using the laser pointer can increase operational convenience for presentation.

However, after the laser light signal is projected from the laser pointer to the display, visual brightness of the generated cursor depends on power intensity of the laser light signal and a surface reflectivity of the display. In other words, it cannot guarantee that the laser pointer can generate a "visual" cursor. For example, when the display is a liquid-crystal display, the laser light signal emitted from the laser pointer may be absorbed by a surface of the liquid-crystal display. Thus, since the surface reflectivity of the liquid-crystal display is very small, the cursor is barely identified on the liquid-crystal display. Further, even if the display can reflect the laser light signal to generate an identifiable cursor, when a relative position or an angle between the laser pointer and the display is changed (i.e., a turned around action is made), an unexpected motion of the cursor on the display may occur. When the user wants to face the display again for presentation by using the laser pointer, it is required to search a "tiny" light point visually. Specifically, since an initial position of the light point is uncertain, using an efficient method for presentation is unachievable. Thus, operational efficiency of the laser pointer may be reduced.

SUMMARY OF THE INVENTION

In an embodiment of the present invention, a cursor calibration method is disclosed. The cursor calibration method includes setting a threshold angle, and displaying a cursor of a pointer on a predetermined position of a display when an elevation angle between a pointing direction of the pointer and a horizontal plane is reduced from greater than the threshold angle to smaller than or equal to the threshold angle.

In another embodiment of the present invention, a cursor calibration system is disclosed. The cursor calibration system includes a pointer, a processing device, and a display. The pointer includes a gravity sensor configured to detect an elevation angle and a displacement of the pointer, and a first transmitter coupled to the gravity sensor and configured to transmit an elevation angle signal and a displacement signal according to the elevation angle and the displacement. The processing device includes a second receiver coupled to the first transmitter of the pointer and configured to receive the elevation angle signal and the displacement signal, a memory coupled to the second receiver, the memory comprising a software program for generating a pointing signal according to the elevation angle signal and the displacement signal, and a second transmitter coupled to the memory for transmitting the pointing signal. The display is coupled to the processing device and configured to receive the pointing signal in order to display a cursor according to the pointing signal. When the elevation angle is reduced from greater than a threshold angle to smaller than or equal to the threshold angle, the processing device controls the cursor to display on a predetermined position of the display.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
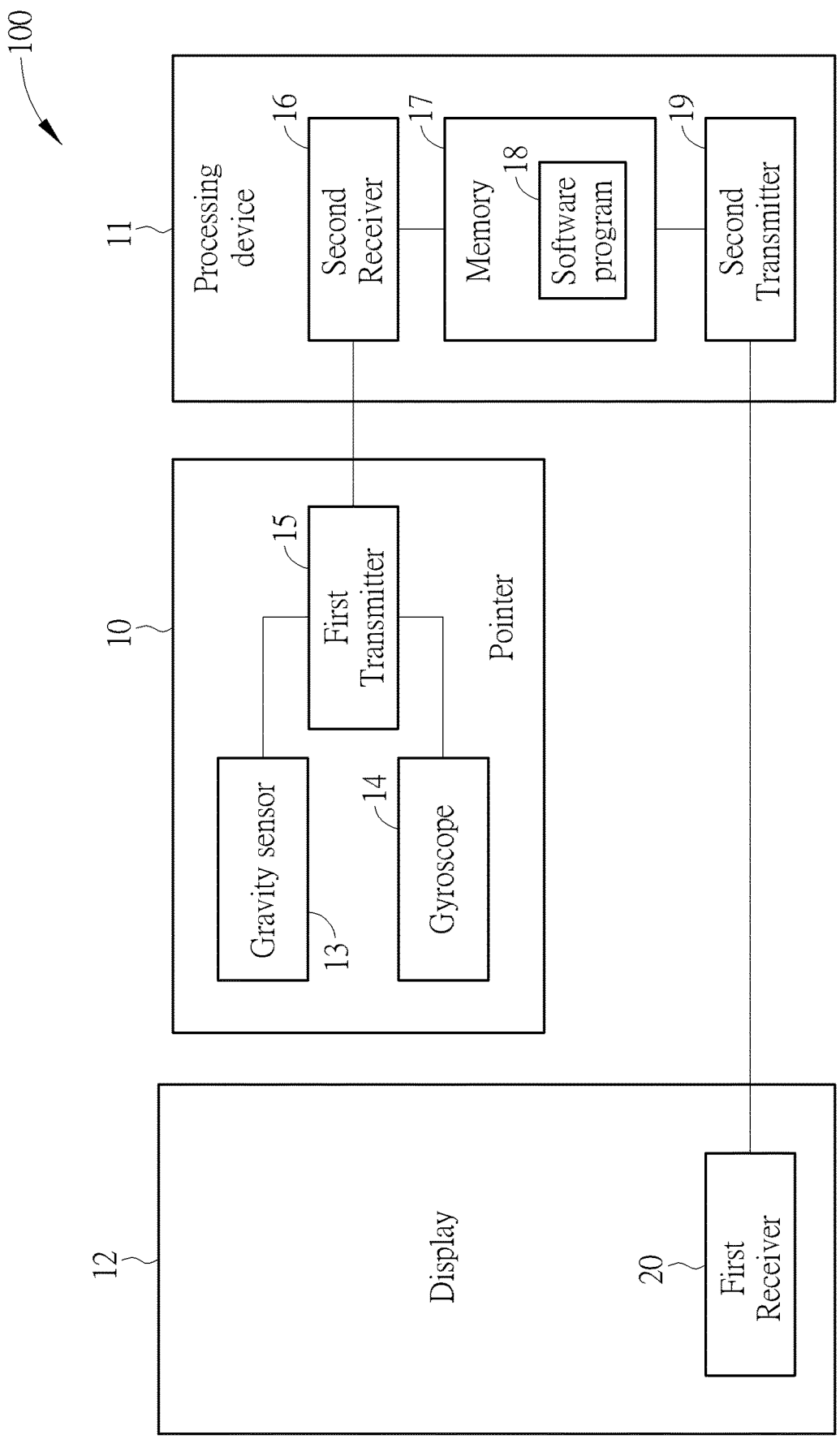
FIG. 1 is a block diagram of a cursor calibration system according to an embodiment of the present invention.

FIG. 1 is a block diagram of a cursor calibration system 100 according to an embodiment of the present invention. The cursor calibration system 100 includes a pointer 10, a processing device 11, and a display 12. The pointer 10 can be any pen type or long strip type pointer. In the embodiment, the pointer 10 can be a pointer without capability of emitting a light signal. The pointer 10 includes a gravity sensor 13 and a first transmitter 15. The gravity sensor 13 can be also called an accelerometer for detecting a motion speed, a displacement, and/or an elevation angle of the pointer 10. The pointer 10 can further include a gyroscope 14 for assisting the gravity sensor 13 in detecting the elevation angle of the pointer 10. After variations of the elevation angle and the displacement of the pointer 10 are detected, the pointer 10 generates an elevation angle signal and a displacement signal. The first transmitter 15 is coupled to the gravity sensor 13 and the gyroscope 14 for transmitting the elevation angle signal and the displacement signal to the processing device 11. Any hardware modification of the gravity sensor 13, the gyroscope 14, and the first transmitter 15 falls into the scope of the present invention. For example, a triaxial based acceleration sensor can be introduced to the pointer 10. A six-axis based acceleration sensor in conjunction with the gyroscope 14 can be introduced to the pointer 10 for detecting the elevation angle and the displacement of the pointer 10. The first transmitter 15 can use a wireless link for connecting to the processing device 11. For example, the first transmitter 15 can establish a wireless link with a Wi-Fi protocol or a Bluetooth protocol. The processing device 11 can be any programmable or logical processing device, such as a personal computer, a working station, a notebook, or a tablet. The processing device 11 includes a second receiver 16, a memory 17, and a second transmitter 19. The second receiver 16 and the second transmitter 19 form a pair-wised transceiver. The second receiver 16 is used for receiving the elevation angle signal and the displacement signal transmitted from the first transmitter 15. The memory 17 is coupled to the second receiver 16. The memory 17 can be any data storage device, such as a hard disk, a non-volatile memory, a random access memory. A software program 18 can be installed in the memory 17. The software program 18 can be used for generating a pointing signal according to the elevation angle signal and the displacement signal. In practice, when the processing device 11 is a computer, a central processing unit of the computer can output the pointing signal according to the elevation angle signal and the displacement signal by using the software program 18. The second transmitter 19 is coupled to the memory 17 for transmitting the pointing signal to the display 12. The second transmitter 19 can use a wireless link for connecting the display 12. For example, the second transmitter 19 can establish the wireless link with the Wi-Fi protocol or the Bluetooth protocol for connecting the display 12. The display 12 is coupled to the processing device 11 for receiving the pointing signal in order to display a cursor according to the pointing signal. The display 12 can be any type display. The display can include a first receiver 20. The first receiver 20 and the second transmitter 19 form a pair-wised transceiver. The first receiver 20 can be used for receiving the pointing signal transmitted from the second transmitter 19.

In the cursor calibration system 100, the cursor displayed on the display 12 is not generated by reflecting a laser light from the pointer 10. The cursor displayed on the display 12 is generated according to the pointing signal. The pointing signal is outputted from the processing device 11 by using the software program 18. Thus, the pointer 10 here can be regarded as a "virtual" laser pointer. Since the cursor is not generated by reflecting the laser light from the pointer 10, the visual brightness of the cursor is irrelevant to the surface reflectivity of the display 12. In other words, all type displays can display "visual" cursor. Further, the pointer 10 can be a portable pointer with low power consumption and low weight. To improve operation efficiency of the pointer 10, an intuitive cursor calibration method can be introduced for calibrating an initial position of the cursor. The intuitive cursor calibration method can also increase a user's operating experience. The method for calibrating the initial position of the cursor is illustrated below.

Figure 2:
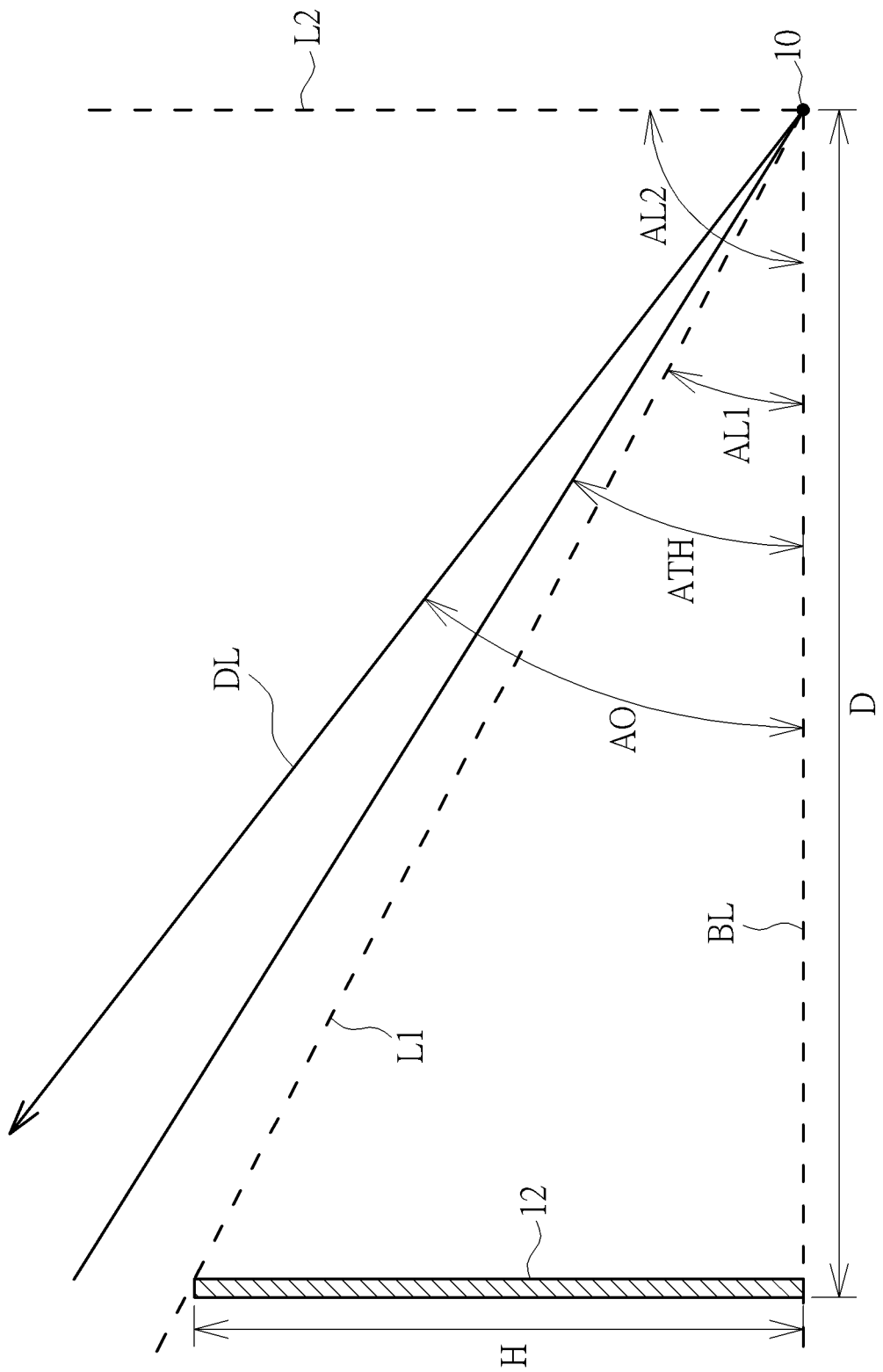
FIG. 2 is an illustration of correlations of an elevation angle, a threshold angle, a first angle, and a second angle of a pointer in the cursor calibration system in FIG. 1.

FIG. 2 is an illustration of correlations of an elevation angle AO, a threshold angle ATH, a first angle AL1, and a second angle AL2 of a pointer 10 in the cursor calibration system 100. In the cursor calibration system 100, when the pointer 10 is held by a user facing the display 12, the elevation angle AO, the threshold angle ATH, the first angle AL1, and the second angle AL2 can be defined, as illustrated below. In FIG. 2, the pointer 10 can be a long strip type pointer. A pointing direction of the pointer 10 is denoted as DL. The pointing direction DL and a horizontal plane BL form the elevation angle AO. The display 12 has a height equal to H. A distance between the display 12 and the pointer 10 is equal to D (hereafter, say "a distance D"). Thus, a first axis L1 can be generated from the pointer 10 to a top terminal of the display 12. The first angle AL1 can be generated between the first axis L1 and the horizontal plane BL. Here, the first angle AL1 can be written as arctan(H/D). Arctan is an arctangent function. Further, a second axis L2 can be introduced to the cursor calibration system 100. The second axis L2 can be perpendicular to the horizontal plane BL. In other words, the second angle AL2 between the second axis L2 and the horizontal plane BL is substantially equal to $\pi/2$. Thus, in the cursor calibration system 100, the second angle AL2 (around $\pi/2$) is greater than the first angle AL1 (i.e., arctan(H/D)). Before the cursor calibration system 100 performs a calibration function, a threshold angle ATH can be introduced. The threshold angle ATH can be a user-defined angle between the first angle AL1 and the second angle AL2. In mathematical representation, the threshold angle ATH satisfies arctan(H/D)$\leq$ATH$<\pi/2$. In other words, the threshold angle ATH can be set equal to arctan(H/D). In other embodiments, the threshold angle ATH can be a system default value. Additionally, as previously mentioned, the display 12 can include the first receiver 20. The first receiver 20 can be used for receiving a wireless signal transmitted from the first transmitter 15 of the pointer 10. Then, the wireless signal can be used for evaluating a received signal strength indicator (RSSI) value in order to estimate a distance D between the display 12 and the pointer 10. Specifically, the distance D between the display 12 and the pointer 10 can be automatically estimated according to the RSSI value, or can be manually inputted by a user. Any reasonable algorithm can be used for defining the distance D and evaluating the threshold angle ATH. In the cursor calibration system 100, any reasonable hardware, software, or algorithm modification falls into the scope of the present invention.

Figure 3:
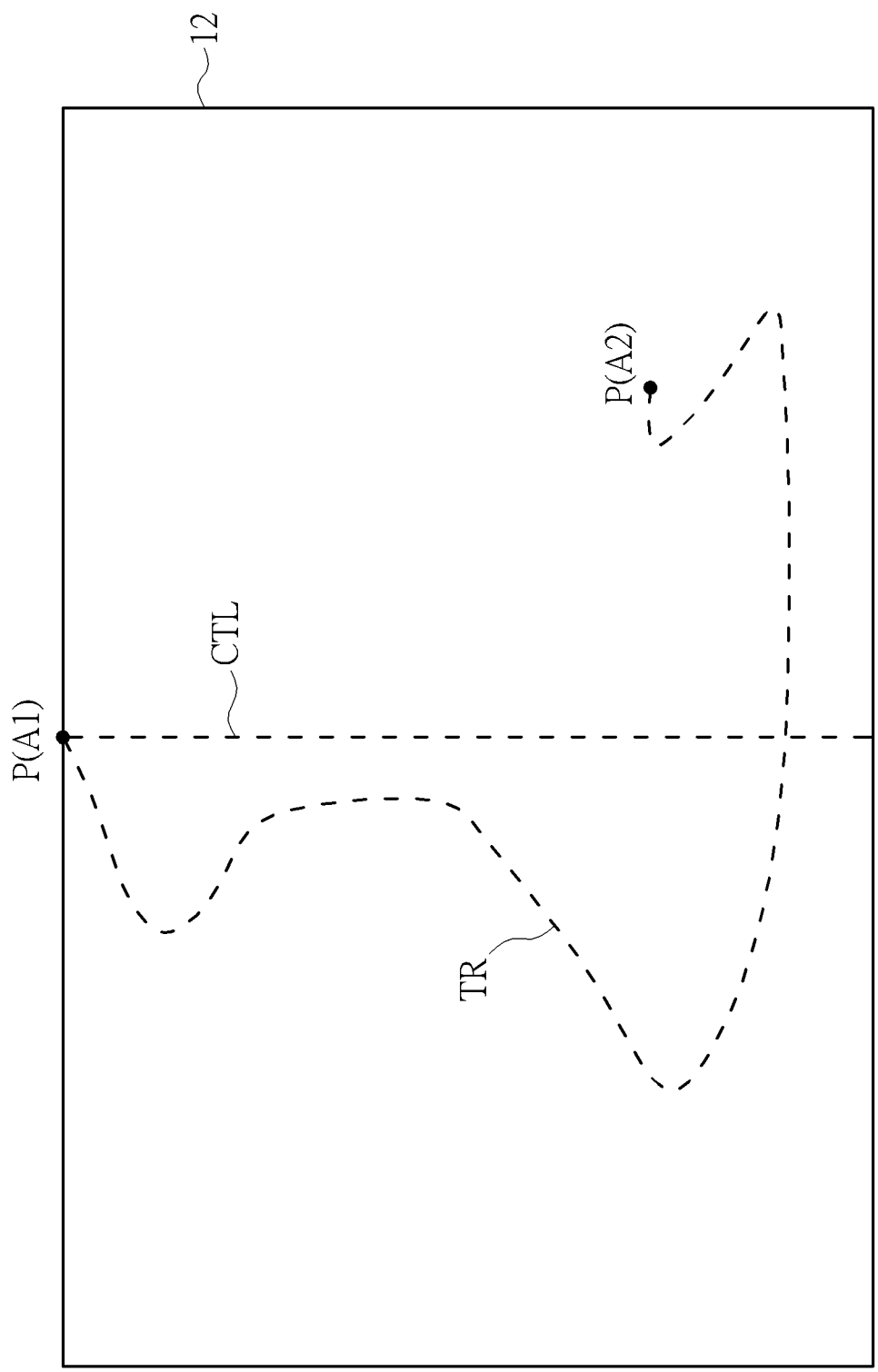
FIG. 3 is an illustration of position variation of the cursor in the cursor calibration system in FIG. 1.

FIG. 3 is an illustration of position variation of the cursor P in the cursor calibration system 100. As previously mentioned, the threshold angle ATH is predetermined. Then, the elevation angle AO between the pointing direction DL of the pointer 10 and the horizontal plane BL can be reduced from greater than the threshold angle ATH to smaller than or equal to the threshold angle ATH. For example, a user can tilt the pointer 10 upward (i.e., in anti-gravity direction) for initializing the elevation angle AO between the pointing direction DL of the pointer 10 and the horizontal plane BL greater than the threshold angle ATH. Then, the user can tilt the pointer 10 downward (i.e., in gravity direction) for reducing the elevation angle AO between the pointing direction DL of the pointer 10 and the horizontal plane BL from greater than the threshold angle ATH to smaller than or equal to the threshold angle ATH. When the elevation angle AO between the pointing direction DL of the pointer 10 and the horizontal plane BL is reduced from greater than the threshold angle ATH to smaller than or equal to the threshold angle ATH, a cursor position calibration process in the cursor calibration system 100 is triggered. Then, the cursor calibration system 100 can control the cursor P of the pointer 10 to display on the predetermined position of the display 12 by using a software program 18 installed in the processing device 11. For example, as shown in FIG. 3, when the elevation angle AO between the pointing direction DL of the pointer 10 and the horizontal plane BL is reduced from greater than the threshold angle ATH to smaller than or equal to the threshold angle ATH, an initial position A1 of the cursor P is on an upper end of a center line CTL of the display 12. Thus, after an aforementioned gesture is completed by the user, the cursor P can be expected to display on the position A1. Thus, searching a "tiny" light point at an uncertain position visually can be avoidable. Further, since the initial position A1 of the cursor P is known, operation efficiency or convenience can also be increased. After the cursor P is on the position A1, the cursor P can be moved according to a vertical swing or a horizontal swing of the pointer 10. For example, the cursor P can be moved along a track TR on the display 12. Eventually, the position of the cursor P is changed to A2. A cursor moving method on the display 12 is illustrated below.

Figure 4:
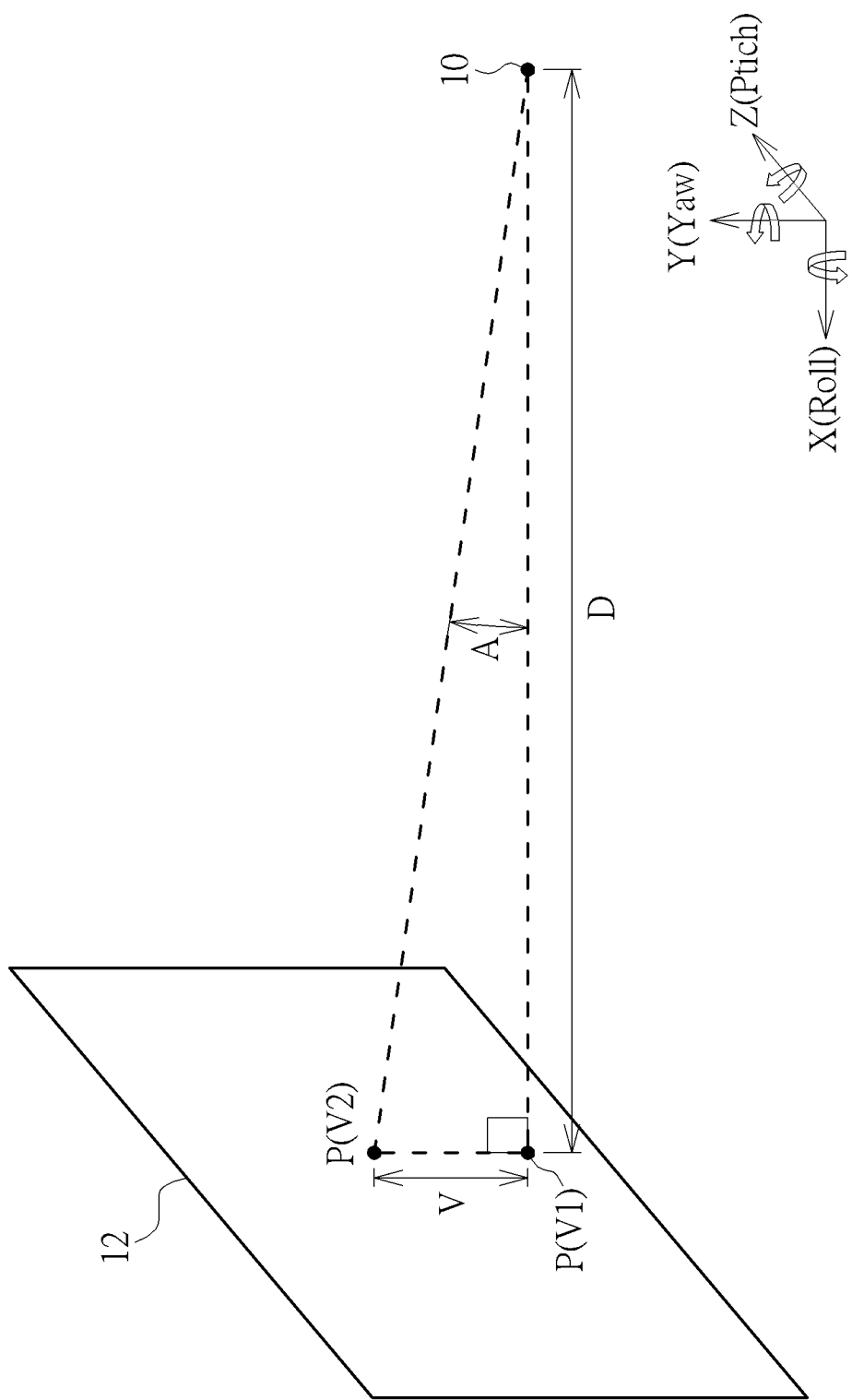
FIG. 4 is an illustration of a motion status of the cursor displayed on the display when the pointer is vertically moved.
Figure 5:
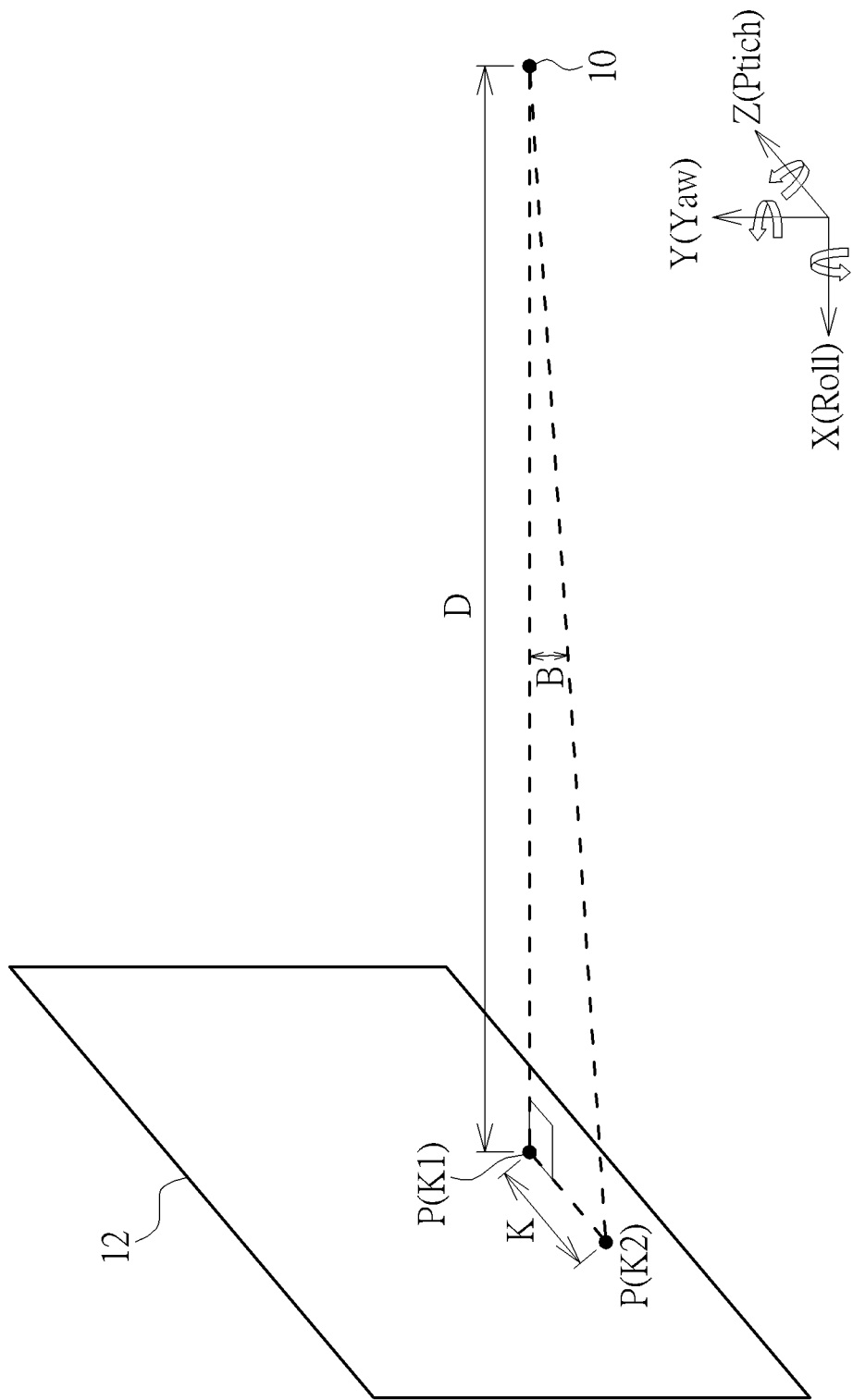
FIG. 5 is an illustration of a motion status of the cursor displayed on the display when the pointer is horizontally moved.

FIG. 4 is an illustration of a motion status of the cursor P displayed on the display 12 when the pointer 10 is vertically moved (i.e., such as rotating the pointer 10 around an axis Z). FIG. 5 is an illustration of a motion status of the cursor P displayed on the display 12 when the pointer 10 is horizontally moved (i.e., such as rotating the pointer 10 around an axis Y). Here, the aforementioned track TR can be any two-dimensional curve. Thus, when the cursor P is moved along the track TR on the display 12, a direction vector of motion during a time interval can be decomposed into a horizontal movement component and a vertical movement component. The cursor calibration system 100 can continuously control a moving direction of the cursor P by using the software program 18 according to the horizontal movement component and the vertical movement component. In FIG. 4, a distance between the pointer 10 and the display 12 is equal to D (hereafter, say "the distance D"). A pointing direction of the pointer 10 (i.e., along an X-axis) is vertically swung (i.e., rotating around a Z-axis). For example, when the pointer 10 is vertically swung with a vertical swing angle A, the cursor P displayed on the display 12 is also moved between a position V1 and a position V2. For example, when an elevation angle of the pointer 10 is reduced by the vertical swing angle A, the cursor P displayed on the display 12 is moved from the position V2 to the position V1. When an elevation angle of the pointer 10 is increased by the vertical swing angle A, the cursor P displayed on the display 12 is moved from the position V1 to the position V2. In FIG. 4, when the pointer 10 is placed (or say, held) horizontally for facing a central position of the display 12, a distance V between the position V1 and the position V2 can be expressed as D×tan(A). Tan is a tangent function. In other words, when the pointer 10 detects the vertical swing angle A and the distance D, the cursor P can be moved vertically for an offset equal to D×tan (A) on the display 12 by using the software program 18 according to the vertical swing angle A and the distance D. However, vertically moving the cursor P for the offset equal to D×tan(A) on the display 12 can be achieved by another method. For example, if the pointer 12 is translated vertically for a distance, the cursor P on the display 12 can also be translated vertically for a distance.

In FIG. 5, a distance between the pointer 10 and the display 12 is equal to D (hereafter, say "the distance D"). A pointing direction of the pointer 10 (i.e., along an X-axis) is horizontally swung (i.e.; rotating around a Y-axis). For example, when the pointer 10 is horizontally swung with a horizontal swing angle B, the cursor P displayed on the display 12 is also moved between a position K1 and a position K2. For example, when the pointing direction of the pointer 10 is changed from a right side to a left side, the horizontal swing angle B is generated. Then, the cursor P displayed on the display 12 is moved from a position K1 to a position K2. When the pointing direction of the pointer 10 is changed from the left side to the right side, the horizontal swing angle B is generated. Then, the cursor P displayed on the display 12 is moved from the position K2 to the position K1. In FIG. 5, when the pointer 10 is placed (or say, held) horizontally for facing the central position of the display 12, a distance K between the position K1 and the position K2 can be expressed as D×tan(B). Tan is a tangent function. In other words, when the pointer 10 detects the horizontal swing angle B and the distance D, the cursor P can be moved horizontally for an offset equal to D×tan(B) on the display 12 by using the software program 18 according to the horizontal swing angle B and the distance D. However, horizontally moving the cursor P for the offset equal to D×tan(B) on the display 12 can be achieved by another method. For example, if the pointer 12 is translated horizontally for a distance, the cursor P on the display 12 can also be translated horizontally for a distance.

Particularly, the X-axis, the Y-axis, and the Z-axis shown in FIG. 4 and FIG. 5 can be three axes corresponding to the pointer 10. For example, the X-axis can be a roll axis in parallel with the pointing direction. The Y axis can be a yaw axis opposite to the gravity direction. Z can be a pitch axis. The pitch axis and the yaw axis are perpendicular to one another.

Figure 6:
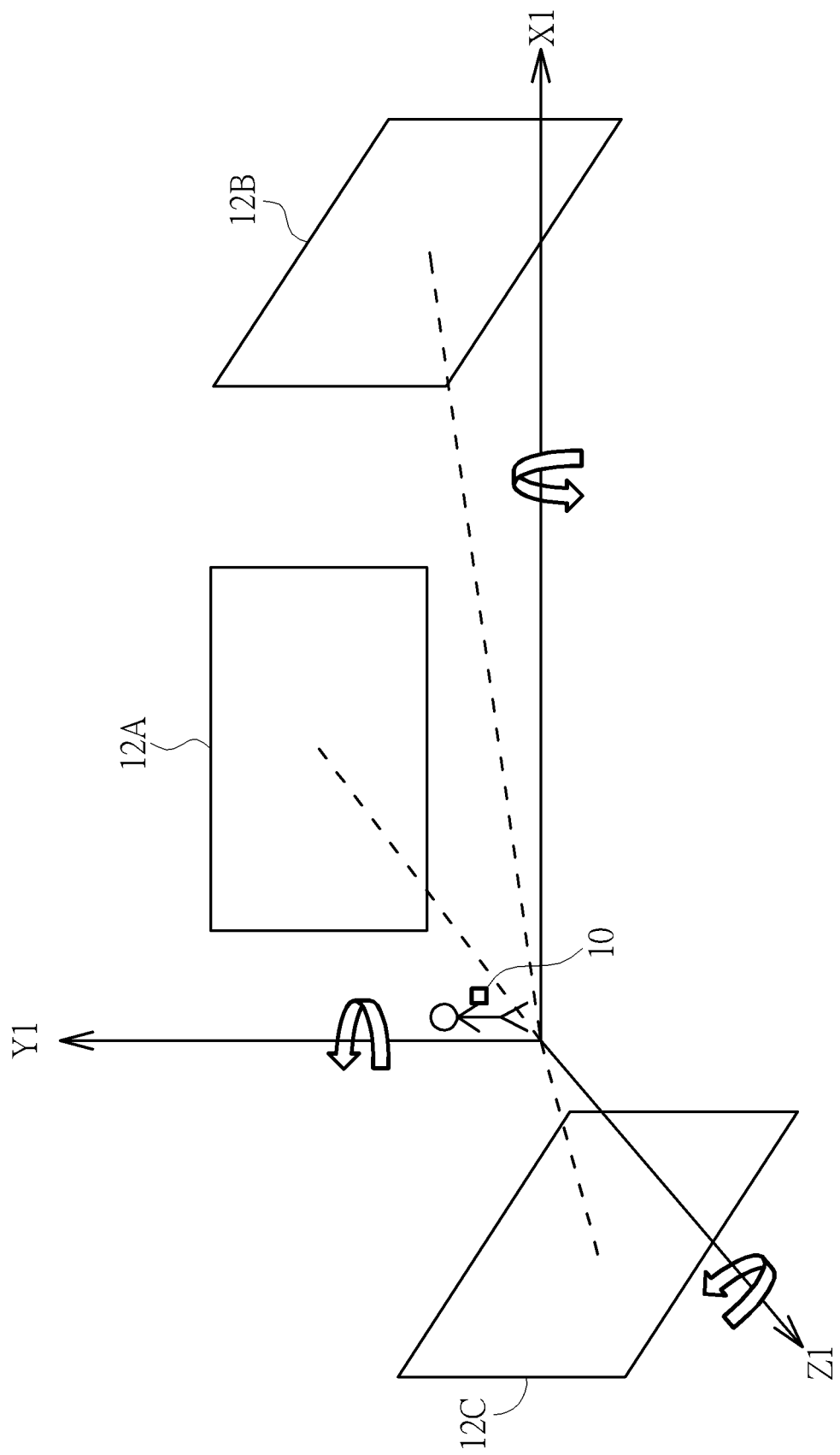
FIG. 6 is an illustration of an absolute coordinate system in the cursor calibration system in FIG. 1.

FIG. 6 is an illustration of an absolute coordinate system in the cursor calibration system 100. When the cursor calibration system 100 performs to calibrate the cursor, an elevation angle variation and displacement of the pointer 10 can be detected according to the absolute coordinate system. In FIG. 6, the absolute coordinate system can be a three-dimensional coordinate system. The absolute coordinate system includes a Y1-axis opposite to the gravity direction, an X1-axis perpendicular to the Y1-axis, and a Z1-axis perpendicular to the X1-axis. Specifically, since the Y1-axis is opposite to the gravity direction, the Y1-axis in FIG. 6 and the yaw axis Y in FIG. 4 and FIG. 5 are parallel. A user position can be at an origin of the three-dimensional coordinate system. However, the user position can be at anyplace of the three-dimensional coordinate system. A display 12A, a display 12B, and a display 12C can be three displays located on different positions. For example, the display 12A, the display 12B, and the display 12C can be three devices around the Y1-axis. Since the display 12A, the display 12B, and the display 12C are three devices around the Y1-axis, when the user turns around for facing one of displays, it can be regarded that the user turns around the Y1-axis. Further, since the pointer 10 can be a portable pointer, the pointer 10 can be held by the user for rotating around the pitch axis Z illustrated in FIG. 4 and FIG. 5 in order to reduce the elevation angle of the pointer 10 from greater than the threshold angle ATH to smaller than or equal to the threshold angle ATH. Then, a cursor calibration process can be triggered. For example, the pointer 10 can be held by the user. The user can turn around the Y1-axis for facing a central position of the display 12B. Particularly, the roll axis X in FIG. 4 and FIG. 5 can be defined in parallel with a pointing direction of the pointer 10 (i.e., pointer 10 points to the display 12B). Then, the pointer 10 can be held by the user for rotating around the pitch axis Z. By doing so, an initial position of the cursor P is on a predetermined position of the display 12B (i.e., an upper end of a center line of the display 12B). Similarly, pointer 10 can be held by the user. The user can turn around the Y1-axis for facing a central position of the display 12C. Here, the roll axis X in FIG. 4 and FIG. 5 can be defined in parallel with a pointing direction of the pointer 10 (i.e., pointer 10 points to the display 12C). Then, the pointer 10 can be held by the user for rotating around the pitch axis Z. By doing so, an initial position of the cursor P is on a predetermined position of the display 12C (i.e., an upper end of a center line of the display 12C). Thus, an efficient, smooth, and intuitive operation method for calibrating the position of the cursor P can be introduced. For the user, a continuous action including turning around for facing to the display and swinging the pointer 10 can be performed in order to calibrate the initial position of the cursor P. In other words, in the cursor calibration system 100, the cursor calibration method can be used for any display around the Y1-axis with arbitrary angle. Regardless of the position of the display in the absolute coordinate system, when the elevation angle between a pointing direction DL of the pointer 10 and the horizontal plane BL is reduced from greater than the threshold angle ATH to smaller than or equal to the threshold angle ATH (as shown in FIG. 2), the initial position of the cursor P is expectedly located on the upper end of the center line CTL of the display. Thus, searching a "tiny" light point of the cursor P on an uncertain initial position visually can be avoidable. Thus, operation efficiency can be increased. Additionally, as previously mentioned, the pointer 10 can include the gravity sensor 13 and the gyroscope 14. Thus, the pointer 10 can self-detect its motion or three-dimensional coordinates variations in the absolute coordinate system. For example, the pointer 10 can be held by a user. When the user turns around with 45 degrees of angle for facing the display 12B, the pointer 10 can detect its position variation (i.e., clockwise rotating 45 degrees of angle around the Y1-axis). Thus, the software program 18 can define a central point of the display 12B along a pointing direction of the pointer 10 after a value of 45 degrees of angle rotating around the Y1-axis. Then, any motion of the cursor displayed on the display 12B depends on a calibration value with respect to 45 degrees of angle rotating around the Y1-axis. Therefore, a user can easily and intuitively find the initial position of the cursor displayed on the display 12B. Thus, operation efficiency can be increased. For another embodiment, the pointer 10 can be held by a user. When the user turns around with 225 degrees of angle for facing the display 12C, the pointer 10 can detect its position variation (i.e., clockwise rotating 225 degrees of angle around the Y1-axis). Thus, the software program 18 can define a central point of the display 12C along a pointing direction of the pointer 10 after a value of 225 degrees of angle rotating around the Y1-axis. Then, any motion of the cursor displayed on the display 12C depends on a calibration value with respect to 225 degrees of angle rotating around the Y1-axis. Therefore, a user can easily and intuitively find the initial condition of the cursor displayed on the display 12C. Thus, operation efficiency can be increased. Further, a condition for triggering the cursor calibrating process can be a condition satisfying the elevation angle AO of the pointer 10 being reduced from greater than the threshold angle ATH to smaller than or equal to the threshold angle ATH. The user turning around for facing the display based on the Y1-axis can be regarded as an intuitive action. Thus, the cursor calibration method of the present invention belongs to an intuitive cursor calibration method.

Figure 7:
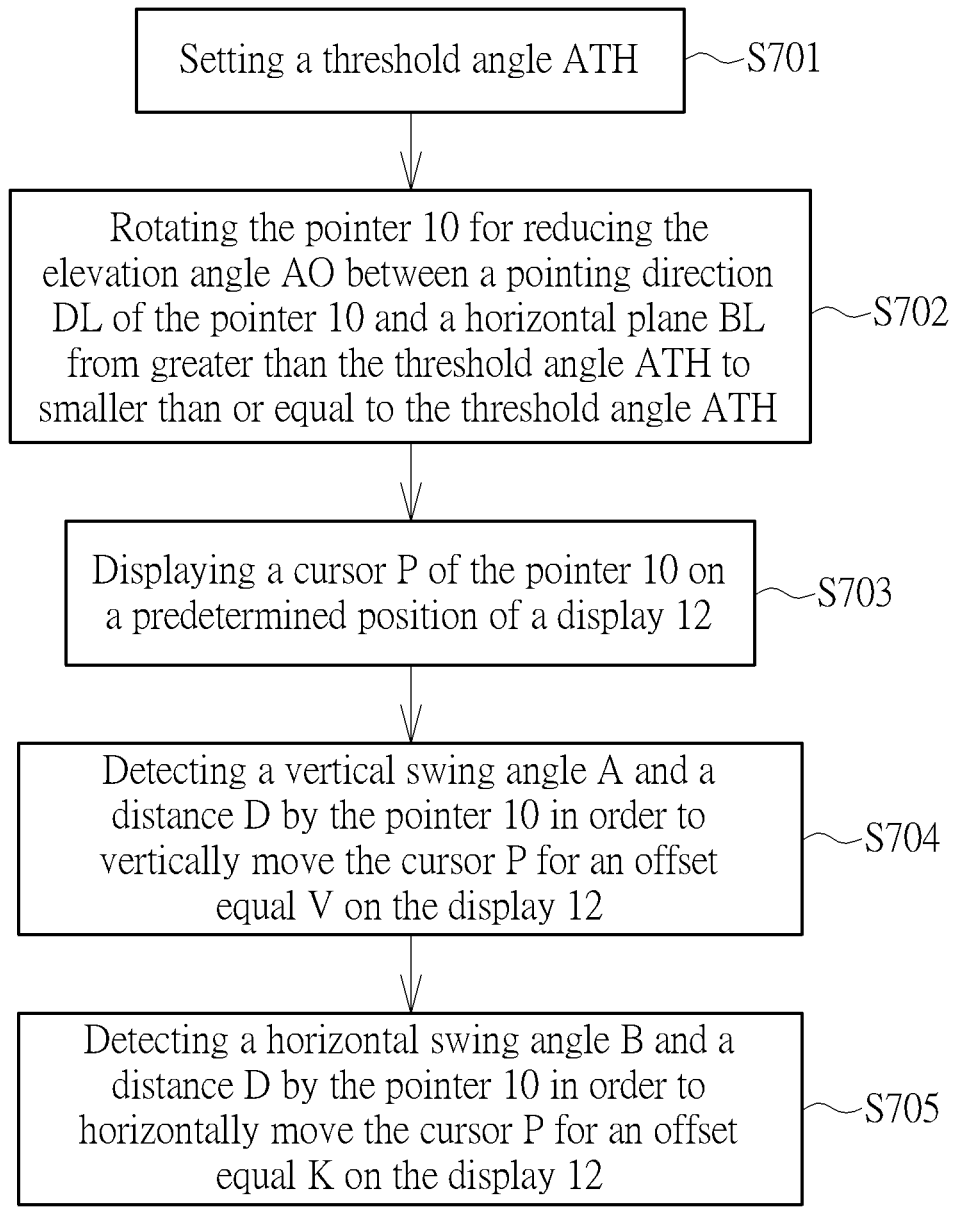
FIG. 7 is a flow chart of a cursor calibration method in the cursor calibration system in FIG. 1.

FIG. 7 is a flow chart of a cursor calibration method in the cursor calibration system 100. The cursor calibration system 100 includes step S701 to step S705. Any reasonable modification of step S701 to step S705 falls into the scope of the present invention. Step S701 to step S705 are illustrated below.

step S701: setting a threshold angle ATH;
step S702: rotating the pointer 10 for reducing the elevation angle AO between a pointing direction DL of the pointer 10 and a horizontal plane BL from greater than the threshold angle ATH to smaller than or equal to the threshold angle ATH;
step S703: displaying a cursor P of the pointer 10 on a predetermined position of a display 12;
step S704: detecting a vertical swing angle A and a distance D by the pointer 10 in order to vertically move the cursor P for an offset equal V on the display 12;
step S705: detecting a horizontal swing angle B and a distance D by the pointer 10 in order to horizontally move the cursor P for an offset equal K on the display 12.

Operations of step S701 to step S705 are previously illustrated. Thus, they are omitted here. In the cursor calibration method of the present invention, step S701 can be regarded as a pre-processing for configuring parameters. Step S702 can be regarded as a manual operation for triggering the cursor calibration process. Step S704 to step S705 can be regarded as a moving process after the initial position of the cursor P is calibrated. However, step S704 to step S705 can be two steps performed simultaneously. In other words, after the initial position is calibrated in step S701 to step S703, the pointer 10 can simultaneously detect a vertical swing angle A, a horizontal swing angle B, and a distance D. Accordingly, the cursor P on the display 12 can be moved for a vertical offset equal to D×tan (A) and a horizontal offset D×tan(B). As previously mentioned, when the cursor P is simultaneously moved for the vertical offset equal to D×tan (A) and the horizontal offset D×tan(B), equivalently, the cursor P is obliquely moved for a distance equal to $\sqrt{(D\times\tan(A))^2+(D\times\tan(B))^2}$. Hereafter, the pointer 10 can continuously detect the vertical swing angle A and the horizontal swing angle B for controlling the movement of the cursor P along the track TR.

To sum up, a cursor calibration method and a cursor calibration system are disclosed. In the cursor calibration system, the pointer can be regarded as a virtual laser light pointer. Since the cursor is not generated by a laser light signal emitted from the pointer, the surface reflectivity of the display is irrelevant to the visual brightness of the cursor. Therefore, all type displays can display "visual" cursor. Further, the pointer belongs to a portable pointer. A user can tilt the pointer upward (i.e., in anti-gravity direction) for initializing the elevation angle of the pointer greater than the threshold angle. Then, the user can tilt the pointer downward (i.e., in gravity direction) for reducing the elevation angle of the pointer from greater than the threshold angle to smaller than or equal to the threshold angle. By doing so, an initial position of the cursor can be calibrated at a predetermined position (i.e., for example, a central position of the display or an upper end of a center line of the display). In other words, after the aforementioned gesture is completed by the user, the cursor can be expected to display on the initial position (predetermined). Since the initial position of the cursor is expectable, searching a "tiny" light point at an uncertain position visually can be avoided. Thus, operation efficiency or convenience can be increased. Additionally, the cursor calibration system can be applied to virtual laser light pointer in conjunction with an appropriate software program. The cursor calibration system can be used for a remote whiteboard pen system. The cursor calibration can provide an intuitive cursor calibration method for calibrating an offset of the pointing direction of the pointer caused by variation of relative position between the pointer (i.e., held by a user) and the display.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A cursor calibration system comprising:
    a pointer comprising:
        a gravity sensor configured to detect an elevation angle and a displacement of the pointer; and
        a first transmitter coupled to the gravity sensor and configured to transmit an elevation angle signal and a displacement signal according to the elevation angle and the displacement;
    a processing device comprising:
        a second receiver coupled to the first transmitter of the pointer and configured to receive the elevation angle signal and the displacement signal;
        a memory coupled to the second receiver, the memory comprising a software program for generating a pointing signal according to the elevation angle signal and the displacement signal; and
        a second transmitter coupled to the memory for transmitting the pointing signal; and
    a display coupled to the processing device and configured to receive the pointing signal in order to display a cursor according to the pointing signal;
    wherein when the elevation angle is reduced from greater than a threshold angle to smaller than or equal to the threshold angle, the processing device controls the cursor to display on a predetermined position of the display; and
    wherein the threshold angle is substantially between arctan(H/D) and $\pi/2$, H is a height of the display, D is a distance between the display and the pointer, and the arctan is an arctangent function.

2. The system of claim 1, wherein the pointer further comprises a gyroscope configured to assist the gravity sensor in detecting the elevation angle of the pointer.

3. The system of claim 1, wherein the display comprises a first receiver configured to receive a wireless signal transmitted from the first transmitter of the pointer and then evaluate a received signal strength indicator (RSSI) value in order to estimate a distance between the display and the pointer.

4. A cursor calibration method comprising:
    setting a threshold angle; and
    displaying a cursor of a pointer on a predetermined position of a display when an elevation angle between a pointing direction of the pointer and a horizontal plane is reduced from greater than the threshold angle to smaller than or equal to the threshold angle;
    wherein the threshold angle is substantially between arctan (H/D) and $\pi/2$, H is a height of the display, D is a distance between the display and the pointer, and the arctan is an arctangent function.

5. The method of claim 4, wherein the predetermined position is at an upper end of a center line of the display.

6. The method of claim 4, further comprising:
    rotating the pointer around a yaw axis for facing the display; and
    detecting a rotating angle of the yaw axis by the pointer;
    wherein the yaw axis in parallel with the display.

7. The method of claim 6, further comprising:
    rotating the pointer around a pitch axis for reducing the elevation angle from greater than the threshold angle to smaller than or equal to the threshold angle;
    wherein the pitch axis and the yaw axis are perpendicular to one another.

8. The method of claim 4, wherein displaying the cursor of the pointer on the predetermined position of the display is displaying the cursor of the pointer on the predetermined position of the display by using a software program installed in a processing device.

9. The method of claim 4, further comprising:
    detecting a vertical swing angle and a distance by the pointer; and
    vertically moving the cursor for an offset equal to D×tan (A) on the display;
    wherein D is the distance, A is the vertical swing angle, tan is a tangent function, and the distance is between the display and the pointer.

10. The method of claim 4, further comprising:
    detecting a horizontal swing angle and a distance by the pointer; and
    horizontally moving the cursor for an offset equal to D×tan(B) on the display;
    wherein D is the distance, B is the horizontal swing angle, tan is a tangent function, and the distance is between the display and the pointer.

* * * * *